June 22, 1954     E. V. SUNDT     2,681,527
ARTIST'S CANVAS
Filed March 23, 1951
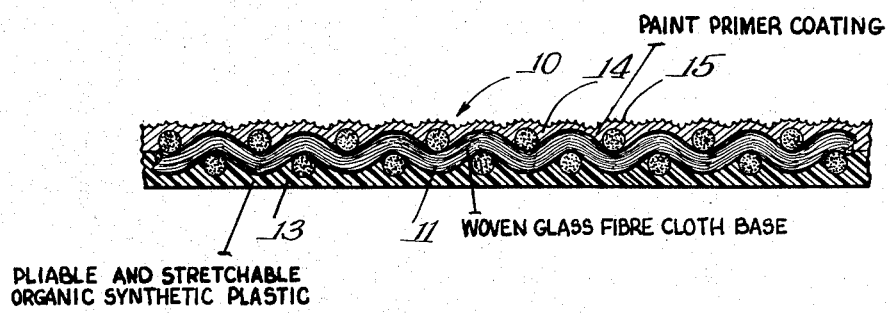
INVENTOR.
Edward V. Sundt
BY
Wallenstein & Spangenberg
attys.

Patented June 22, 1954

2,681,527

UNITED STATES PATENT OFFICE 2,681,527

ARTIST'S CANVAS

Edward V. Sundt, Wilmette, Ill.

Application March 23, 1951, Serial No. 217,097

5 Claims. (Cl. 41—32)

This invention relates to an artist's canvas.

In the conventional artist's canvas, made of cotton or linen fabric, rotting and decay eventually take place, creating the need for costly restorations of fine paintings. A particularly annoying and troublesome quality of conventional artist's canvases is their tendency to absorb moisture with the result that the canvas sags on humid days and stretches again on drying. This has the effect of loosening the paint and causing hairline cracks so often found on old paintings. Further, conventional artist's canvases, being of organic material, are susceptible to the action of fungus and mildew which is especially bad in tropical climates. Also, these canvases gradually absorb the oils from the paintings, resulting in a dull and dead appearance of the paintings.

The principal object of this invention is to provide an improved artist's canvas wherein all of the above shortcomings of conventional artist's canvases are overcome, wherein long life of paintings thereon is assured, wherein changes in moisture in the air have substantially no effect thereon, wherein loosening of the paint and the appearance of hairline cracks are substantially eliminated, wherein paintings thereon remain live and fresh over extended periods of time, wherein the action of fungus and mildew is substantially eliminated, and wherein an ideal toothed surface is provided for oil painting purposes.

Generally, the artist's canvas of this invention includes a woven glass fibre cloth base, a coating of pliable and stretchable organic synthetic plastic impregnating one side of the woven glass fibre cloth base, and a coating of paint primer compatible to linseed oil impregnating the other side of the woven glass fibre cloth base.

The woven glas fibre cloth base is chemically substantially inert, is not affected by moisture, fungus and mildrew and is sufficiently stretchable and pliable for application to a frame. The organic synthetic plastic coating, impregnating one side of the woven glass fibre cloth base, is also chemically substantially inert and not affected by moisture, fungus and mildew. It operates to bind the relatively smooth glass fibre threads or strands of the woven glass fibre cloth base to prevent warping and sliding of the same, and yet, is sufficiently pliable and stretchable to permit the completed artist's canvas to be readily applied to a frame in conventional manner.

The coating of paint primer, impregnating the other side of the woven glass fibre cloth base, is compatible to linseed oil and provides the surface to be painted upon. This fills the spaces between the glass fibre threads or strands of the cloth base and provides an anchor base for the paint when later applied. The paint primer coating is preferably applied in a tacky condition by a roller to provide a toothed surface upon which the oil paints may be more readily applied. The paint primer coating also preferably includes a fungicide to minimize fungus action thereon.

Other objects and advantages of this invention will become apparent to those skilled in the art upon reference to the accompanying specification, claims and drawing, in which the single figure of the drawing is an enlarged sectional view through the artist's canvas of this invention.

The artist's canvas of this invention is generally designated at 10 and it includes a woven glass fibre cloth base 11 preferably of a thickness of substantially .008 to .010 inch and having a rectangular mesh of about 32 strands or threads per inch. The glass fibre cloth is, therefore, relatively close woven so that the strands present as much of a grain effect as possible for a smooth surface is not as good to paint upon with oils as a grained surface. Preferably, the woven glass fibre cloth should be about 42 to 45 inches wide, this being the most useful width for oil painting purposes. This woven glass fibre cloth forms the base of the artist's canvas of this invention and it is chemically substantially inert and not affected by moisture, fungus and mildew. It is also stretchable and pliable for convenient application to a supporting frame.

An organic synthetic plastic coating 13 impregnates one side of the woven glass fibre cloth base and, preferably, this coating is approximately .005 inch thick. It, therefore, in addition to coating one surface of the artist's canvas, also impregnates the woven cloth base and operates to bind the relatively smooth glass fibre threads or strands of the base to prevent warping and sliding of the same. This organic synthetic plastic coating is also very pliable and stretchable so as to permit the completed artist's canvas to be readily manipulated and readily applied to a frame in conventional manner. This organic synthetic plastic coating may be applied to the woven glass fibre cloth base in conventional manner. Various kinds of organic synthetic plastics may be utilized but particularly beneficial results are obtained with polyethylene. Satisfactory results are also obtained with soft vinyl resins, such as those used in the making of oilcloths, etc.

A coating of paint primer 14 impregnates the other side of the woven glass fibre cloth base 11 and this coating is compatible to linseed oil and provides the surface to be painted upon. This coating 14 of paint primer fills the spaces between the glass fibre threads or strands of the glass fibre cloth base, but yet provides the grain afforded by the close woven cloth base. The paint primer coating, in addition to being compatible to linseed oil, also has good adhesion to the glass fibres of the woven cloth base and to the organic synthetic plastic coating 13. The paint primer coating 14 may be made from substantially any commercial paint primer, such as a water emulsion of glue, and it may have oils emulsified into it if so desired.

The paint primer coating 14 is preferably applied in a tacky condition to the woven glass fibre cloth base 11 by a roller in order to provide a rough or toothed surface upon which the oil paints may be readily applied. In this connection, the roller is provided with a layer of paint primer in a tacky condition and then the roller is rolled over the surface of the woven cloth base for coating and impregnating the surface with the tacky paint primer. This provides the coated surface with slight raised impressions as the roller leaves the surface. When the surface is dried to remove the tackiness, these slight raised impressions form the tooth in the surface. Thus the surface, in addition to having the grain, is also toothed, as indicated at 15.

The paint primer coating 13 also preferably includes a fungicide to minimize fungus action thereon and it is found that the fungicide, copper-8-quinolinolate, provides exceptionally good results. This fungicide is poisonous to lower organisms but is not toxic to higher animals.

The various elements forming the artist's canvas of this invention all structurally and functionally cooperate with each other to provide a new and improved artist's canvas which eliminates substantially all of the shortcomings of conventional artist's canvas. The new and improved artist's canvas of this invention is not affected by moisture, fungus or mildew, can be readily manipulated and applied to a frame for painting purposes, provides an improved painting surface and assures long life of paintings made thereon.

While for purposes of illustration several forms of this invention have been disclosed, other forms thereof may become apparent to those skilled in the art upon reference to this disclosure and, therefore, this invention is to be limited only by the scope of the appended claims.

I claim as my invention:

1. An artist's canvas which is stretchable and pliable comprising, a woven glass fibre cloth base, a coating of pliable and stretchable polyethylene synthetic plastic impregnating one side of the woven glass fibre cloth base, and a coating of paint primer compatible to linseed oil impregnating the other side of the woven glass fibre cloth base.

2. An artist's canvas which is stretchable and pliable comprising, a woven glass fibre cloth base, a coating of pliable and stretchable polyethylene synthetic plastic impregnating one side of the woven glass fibre cloth base, a coating of paint primer compatible to linseed oil impregnating the other side of the woven glass fibre cloth base, and having a toothed outer surface.

3. An artist's canvas which is stretchable and pliable comprising, a woven glass fibre cloth base, a coating of pliable and stretchable polyethylene synthetic plastic impregnating one side of the woven glass fibre cloth base, a glue-containing coating of paint primer compatible to linseed oil impregnating the other side of the woven glass fibre cloth base, and including a fungicide.

4. An artist's canvas which is stretchable and pliable comprising, a woven glass fibre cloth base of approximately .008 to .010 inch thickness and having a rectangular mesh of about 32 strands per inch, a coating of pliable and stretchable polyethylene synthetic plastic of approximately .005 inch thickness impregnating one side of the woven glass fibre cloth base, a coating of paint primer compatible to linseed oil impregnating the other side of the woven glass fibre cloth base, and having a toothed outer surface.

5. An artist's canvas which is stretchable and pliable comprising, a woven glass fibre cloth base, a coating of pliable and stretchable polyethylene synthetic plastic impregnating one side of the woven glass fibre cloth base, a coating of paint primer compatible to linseed oil impregnating the other side of the woven glass fibre cloth base, and consisting essentially of a water emulsion of glue.

References Cited in the file of this patent

UNITED STATES PATENTS

| Number | Name | Date |
| --- | --- | --- |
| 206,885 | Levin | Aug. 13, 1878 |
| 1,316,782 | Frothingham et al. | Sept. 23, 1919 |
| 1,900,904 | Berger | Mar. 14, 1933 |
| 2,061,570 | Frohlich et al. | Nov. 24, 1936 |
| 2,212,400 | Letteron | Aug. 20, 1940 |
| 2,332,373 | Dorough et al. | Oct. 19, 1943 |
| 2,361,082 | Brown | Oct. 24, 1944 |
| 2,539,301 | Foster | Jan. 23, 1951 |
| 2,541,497 | Buxbaum | Feb. 13, 1951 |

FOREIGN PATENTS

| Number | Country | Date |
| --- | --- | --- |
| 634,920 | Great Britain | Mar. 29, 1950 |